US006361695B1

(12) United States Patent
Husain et al.

(10) Patent No.: US 6,361,695 B1
(45) Date of Patent: Mar. 26, 2002

(54) SHIPBOARD WASTEWATER TREATMENT SYSTEM

(75) Inventors: Hidayat Husain, Brampton; Henry Behmann, Puslinch; Fernando A. Tonelli, Dundas; Ming Gang Liu, Brampton, all of (CA)

(73) Assignee: Zenon Environmental Inc., Oakville (CA)

( * ) Notice: Subject to any disclaimer, the term of this patent is extended or adjusted under 35 U.S.C. 154(b) by 0 days.

(21) Appl. No.: 09/677,703

(22) Filed: Sep. 30, 2000

Related U.S. Application Data (60) Provisional application No. 60/157,419, filed on Oct. 2, 1999, provisional application No. 60/206,348, filed on May 23, 2000, and provisional application No. 60/215,845, filed on Jul. 3, 2000.

(51) Int. Cl.$^7$ ............................... C02F 3/20; C02F 3/26
(52) U.S. Cl. ........................ 210/614; 210/620; 210/621; 210/639; 210/195.2; 210/202; 210/220; 210/259; 210/359
(58) Field of Search .............................. 210/614, 620, 210/621, 622, 629, 631, 195.1, 201, 202, 206, 220, 259, 359, 195.2

(56) References Cited

U.S. PATENT DOCUMENTS

| | | | |
|---|---|---|---|
| 3,472,765 A | 10/1969 | Budd et al. ................ 210/607 |
| 3,577,678 A | * 5/1971 | Burton | |
| 4,071,445 A | 1/1978 | Katayama et al. .......... 210/655 |
| 4,197,200 A | 4/1980 | Alig .......................... 210/104 |
| 4,259,182 A | * 3/1981 | Belveal | |
| 4,268,389 A | 5/1981 | Rapp et al. ............... 210/195.3 |
| 4,749,494 A | 6/1988 | Tomoyasu et al. .......... 210/626 |
| 5,151,187 A | 9/1992 | Behmann .................... 210/607 |
| 5,248,424 A | 9/1993 | Cote et al. .................. 210/636 |
| 5,254,253 A | 10/1993 | Behmann .................... 210/607 |
| 5,334,533 A | * 8/1994 | Colasito et al. | |
| 5,342,525 A | * 8/1994 | Rowsell | |
| 5,558,774 A | * 9/1996 | Tonelli et al. | |
| 5,658,458 A | 8/1997 | Keyser et al. ............ 210/195.1 |
| 5,759,491 A | 6/1998 | Bunin ........................ 422/38 |
| 5,770,436 A | * 6/1998 | Mayfield | |
| 5,785,865 A | 7/1998 | Salis ......................... 210/747 |
| 5,807,485 A | 9/1998 | Caplan et al. ............... 210/610 |
| 6,057,147 A | * 5/2000 | Overland et al. | |
| 6,228,264 B1 | * 5/2001 | Yamasaki et al. | |

* cited by examiner

*Primary Examiner*—David A. Simmons
*Assistant Examiner*—Fred Prince
(74) *Attorney, Agent, or Firm*—Andrew Alexander (57) ABSTRACT

A method and system for treating wastewater in an onboard ship sewage treatment system having controlled suspended solids, the method comprising the steps of collecting wastewater in a collection tank and transferring the wastewater to a bioreactor to oxidize organic material contained in the wastewater by adding oxygen-containing gas thereto. The bioreactor is operated to provide a mixed liquor having a solids concentration of at least 5 g/l and the solids concentration is continuously increased in the mixed liquor in the bioreactor to not greater than 30 g/l. When the solids concentration in the mixed liquor reaches at least 15 g/l, a portion of the mixed liquor is removed from the bioreactor. Thereafter, wastewater is added to the bioreactor to decrease the solids concentration of remaining or residual mixed liquor to not less than 5 g/l. The bioreactor is further operated to increase the solids content again. A hollow fiber membrane is used to remove water from the mixed liquor to provide treated effluent.

37 Claims, 2 Drawing Sheets

SHIPBOARD WASTEWATER TREATMENT SYSTEM

CROSS REFERENCE TO RELATED APPLICATION

This application claims the benefit of U.S. Provisional application Nos. 60/157,419, filed Oct. 2, 1999; Ser. No. 60/206,348, filed May 23, 2000; and Ser. No. 60/215,845, filed Jul. 3, 2000, incorporated herein by reference.

BACKGROUND OF THE INVENTION

This invention relates to a wastewater treatment system and more particularly it relates to a shipboard wastewater treatment system where the system operates in the extreme from very high loading to very low or no loading and may remain in a dormant state for periods of time. Also, the system is useful for treating bilge water.

Treatment of black water (sewage) and gray water (wastewater from showers, sinks, kitchens, etc.) aboard ships has many problems when compared to land-based facilities. For example, onboard ship, low flush vacuum toilets are used for conveying black water and thus there is a lack of water dilution because of the low flush and also because of the absence of surface run-off to dilute the organic load. Further, a variety of devices may be used on board ship to restrict the quantity of gray and black water. All of these considerations result in a wastewater which has an average strength much greater than domestic sewage and a quantity per capita per day which is much lower.

Another problem with onboard ship treatment of wastewater results from the short time between human activity, resulting in waste generation, and arrival of waste at the treatment plant. This results in sharp diurnal variations in waste generation onboard ship in which peak waste quantity and quality tend to coincide rather than being separated as on land. For example, onboard ship, nighttime flow rates may be only one tenth ($\frac{1}{10}$) or 10% of the average daytime flow rate, resulting in further problems for a treatment facility.

In addition, onboard ship treatment facilities have a problem with the space that can be dedicated to waste treatment. For example, the height between decks is limited to 8 feet or less, thus standard items for land use facilities cannot be used. Further, ship motion greatly reduces from consideration other standard features, and the lack of trained waste treatment personnel on board requires a very reliable system which is substantially fully automated.

Also, it is important that a system used for black water or gray water be capable of treating bilge water containing oily substances, for example, petroleum and biodegradable material. Thus, by the term wastewater as used herein is meant to include bilge water.

Thus, it will be seen that there is a great need for a shipboard or compact waste treatment system which will overcome these problems and which can be fully automated for shipboard use. Further, the shipboard system must be capable of periods of standby or inactivity, for example, when the ship is in port and yet, be capable of reaching full capacity within a few hours, when the ship is fully loaded with personnel.

Different systems have been proposed for treatment on onboard ship systems. For example, U.S. Pat. No. 5,807,485 discloses an apparatus and method for the continuous biological treatment of ship bilge water contaminated with petroleum and biodegradable materials. The apparatus includes a pumping system attached directly to the bilge or to an oil-water phase separator, for removing the biodegradable material(s) contained in the bilge waste aqueous phase, which is integrated with a means for microbiologically treating the contaminated bilge water. The means for microbiologically treating the contaminated bilge water preferably includes petroleum- and hazardous-degrading microorganisms. In operation, a phase separator system on the ship separates the free-product phase from the contaminated bilge water. The separated free-product is removed for off-site disposal. Contaminated bilge water is fed into the microbiological treatment system for further treatment with eventual discharge overboard or recirculation into the contaminated bilge area.

U.S. Pat. No. 5,151,187 discloses a system for biodegrading oxidizable organic waste in a bioreactor in combination with a membrane ultrafiltration unit used to separate a high quality permeate from activated sludge which is returned to the bioreactor from the membrane unit as a recycle stream. It has been found that in-line fine bubble diffuser or "micronizer" takes advantage of the kinetic energy in the recycle stream to aerate the biomass with surprising efficiency. The micronizer is positioned external to the biomass in the bioreactor; the discharge from the micronizer provides a microaerated tail-jet of the recycle stream which has been infused with a mass of air bubbles from 1–1000 $\mu$m in diameter. The velocity of the compressed air flowed into the micronizer keeps its pores from clogging with sludge. The energy of the recycle stream without the air is insufficient to provide the requisite motive force for adequate oxygen transfer and to establish a predetermined recirculation pattern.

U.S. Pat. No. 5,248,424 discloses a membrane device for withdrawing permeate from a substrate, the flux through the membranes reaching an essentially constant relatively high value because of the critical deployment of fibers of the array as a skein, arching in a buoyantly swayable generally parabolic configuration within the substrate, above at least one of the array's headers in which the terminal end portions of the fibers are potted. The length of each fiber must be greater than the direct center-to-center distance between the array's pair of headers. For use in a large reservoir, an assembly of the array and a gas distributor means has fibers preferably >0.5 meter long, which together provide a surface area >10 m². The terminal end portions of fibers in each header are substantially free from fiber-to-fiber contact.

U.S. Pat. No. 3,472,765 discloses techniques of carrying out biological reactions in conjunction with selectively pressure driven permeable membranes to effect high rate separation of biological life from a carrier liquid or a valuable product of the reaction.

U.S. Pat. No. 4,749,494 discloses an activated sludge treatment process for waste water. In the waste water treatment, waste water containing organic matter is introduced into an activated sludge reaction tank. The excess sludge formed in the reaction tank is introduced into a sludge digestion tank to effect the digestion of said excess sludge by intermittent aeration with air. A part of the digestion tank liquid is passed through a filtration apparatus having an ultrafiltration membrane. The filtrate passed therethrough is withdrawn outside the system and the remainder is circulated to the digestion tank to maintain the liquid volume of the digestion tank at a definite level. When the amount of the reaction tank liquid introduced from the reaction tank into the digestion tank is taken as $W^1$, the digestion tank liquid is returned in an amount of $(0.2$–$0.8)W^1$ to the reaction tank. Thus, the amount of excess sludge to be treated outside the system can be reduced or can be completely eliminated.

U.S. Pat. No. 5,254,253 discloses a system for treating oil water or bilge water in addition to treatment of black water and gray water. The combination provided the essential nutrients for a mass of mixed microorganisms which are well adapted to ingest the nutrients. To facilitate availability of oxygen to the microorganisms so as to provide growth of the microorganisms, and also, to allow them to destroy themselves, excess oxygen is discharged, in a combination of microbubbles and macrobubbles, into a membrane bioreactor (MBR). The mixture of bubbles is preferably generated with coarse (>2 mm) and fine (<20 μm) bubble diffusers. An auxiliary stream, whether alone or a recirculating stream into which air is drawn, may provide the coarse bubbles. The air is entrained in a jet aerator or eductor in a recirculating loop of activated sludge taken from the MBR. Another portion of the contents of the MBR is pumped to a semipermeable membrane which provides water (permeate) of excellent quality. The remaining concentrate is led to a gas micronizing means which produces a tail-jet of microaerated concentrate. The tail-jet is returned to the MBR to provide kinetic energy for maintaining a high velocity of liquid flow in the MBR. A portion of the concentrate is disposed of. Preferably, the liquid waste to be treated onboard does not substantially exceed about 21 meters$^3$/day.

U.S. Pat. No. 4,071,445 discloses a method of treating wastewater on a ship comprising the steps of passing wastewater through a coarse mesh filter and a crushing means; causing the filtered wastewater to flow upward; passing the wastewater through a plurality of downwardly slanting open cellular plate-like members projecting alternately from a pair of opposed walls defining a passage for the upward flow of the wastewater, with a small space provided between the free end of each of the plate-like members and the wall opposed thereto, while causing large suspended solids to be separated from the wastewater and accumulated in a concentrated state beneath each of the plate-like members by flotation with bubbles generated in the interior of each of the plate-like members to thereby reduce suspended solids in the waste water to below 1,000 ppm and clarifying the resulting treated water by passing the treated water through a semipermeable membrane.

U.S. Pat. No. 4,197,200 discloses an automatic dual-mode shipboard wastewater treatment system employing ozone for disinfection of the primary effluent. Solids are removed and pumped, for example, to the ship's boiler or other equipment for incineration, while the liquid waste is pumped through a series of ozone reactors and then to a holding tank from which it is discharged overboard, after accumulating to a predetermined level. The system operates continuously by recirculating the effluent, during low flow periods, between a second holding tank and the ozone reactors.

U.S. Pat. No. 4,268,389 discloses a sewage treatment device of the marine type and operates on an extended aeration principle employing an aerator, clarifier and disinfector. The clarifier is disposed beneath the aerator and the top of the clarifier with a common wall therebetween which forms the bottom of the aerator. A first passage conducts fluid from the aerator to the clarifier and has a central port in the common wall. A second passage conducts fluid from the clarifier to the disinfector. The aerator has an influent inlet and the disinfector has an effluent outlet. The treator includes in the aerator vessel nozzle means for admitting air to the vessel in a direction to cause fluid in the vessel to move orbitally about a vertical axis with the nozzle means being disposed at a level proximate the common wall between the aerator and clarifier.

U.S. Pat. No. 5,759,491 discloses a process and apparatus for the decontamination of infectious waste which produces a flowable influent slurry from a solid waste and aqueous liquid. The influent slurry is caused to flow through a conduit which includes a heat exchanger, a heater which brings the temperature of the slurry to at least 125° C., and a convoluted holding zone which provides a residence time of at least 15 minutes for the heated slurry. In-line agitation of the slurry is accomplished by injection of pressurized gas.

U.S. Pat. No. 5,785,865 discloses a wastewater treatment system for wharf-mooring or riding-at-anchor vessels, boats, ships and watercraft in general, comprising a number of tanks adapted to be submerged and each provided with a respective drawing tube having a connector plug for watertight connection to a wastewater outlet of a respective boat or the like. The tanks are connected to a self-contained purification installation for intaking and treating the sewage.

U.S. Pat. No. 5,658,458 discloses a recycling apparatus for use in a closed-loop waste treatment system which includes components for removal of inert materials. Typically, the system includes a treatment vessel used in conjunction with a clarifier in an internal recycle configuration; clear water from the top of the clarifier is conducted away from the system as treated effluent, while a portion of the biomass settling at the bottom of the clarifier is returned to the head of the treatment vessel through a hydrocyclone and screen arrangement to remove inert content, thereby substantially increasing the efficiency of biological waste-digestion processes.

In spite of these disclosures, there is still a great need for a shipboard waste treatment system which overcomes the problems enumerated above. The present invention provides such a system.

SUMMARY OF THE INVENTION

It is an object of this invention to provide an on shipboard biological wastewater treatment system.

It is another object of this invention to provide an on shipboard wastewater treatment system using submerged membrane microfiltration or ultrafiltration.

Yet, it is another object of this invention to provide an on shipboard wastewater treatment system utilizing an activated sludge process and submerged membrane microfiltration or ultrafiltration in combination capable of high peak loading and capable of being maintained on a stand-by mode.

Further, it is another object of the invention to provide an on shipboard waste treatment system utilizing an activated sludge process and microfiltration membrane combination capable of high peak loading and the microorganism capable of activation in a few hours as the ship leaves port.

And further, it is another object of the invention to provide an on shipboard waste treatment system employing activated sludge and filtration membrane with an improved process for removing insolubles such as cloth, paper, plastic, hair and fibers which detrimentally interfere with membrane operation.

These and other objects will become apparent from a reading of the specification and claims appended hereto.

In accordance with these objects, there is provided a method and system for treating wastewater in an onboard ship sewage treatment system having controlled mixed liquor suspended solids (MLSS), the method comprising the steps of collecting wastewater in a collection tank and transferring the wastewater to a bioreactor to oxidize organic material contained in the wastewater by adding oxygen-containing gas thereto. The bioreactor is operated to provide a mixed liquor having a suspended solids concentration of at least 5 g/l and the mixed liquor solids concentration is continuously increased in the mixed liquor in the bioreactor to not greater than 30 g/l. When the solids concentration in the mixed liquor reaches at least 15 g/l, a portion of the mixed liquor solids is removed from the bioreactor. Thereafter, wastewater is added to the bioreactor to decrease the solids concentration of remaining or residual mixed liquor to not less than 5 g/l. The bioreactor is further operated to increase the solids content again. A hollow fiber membrane container is provided in liquid communication with the bioreactor. The hollow fiber membranes may be disposed substantially horizontally or vertically in the membrane container. A gas dispersing means is located in the container beneath the hollow fiber membrane for sweeping the hollow fibers with gas bubbles. A flow of mixed liquor is directed from the bioreactor to the container to cover the membranes to avoid substantial exposure of the hollow fibers membranes during motion of the ship. Concentrate and mixed liquor are returned from the hollow fiber membrane container to the bioreactor and purified water is removed from the mixed liquor through the hollow fiber membranes as permeate to provide treated effluent.

DETAILED DESCRIPTION OF THE PREFERRED EMBODIMENTS

Figure 1:
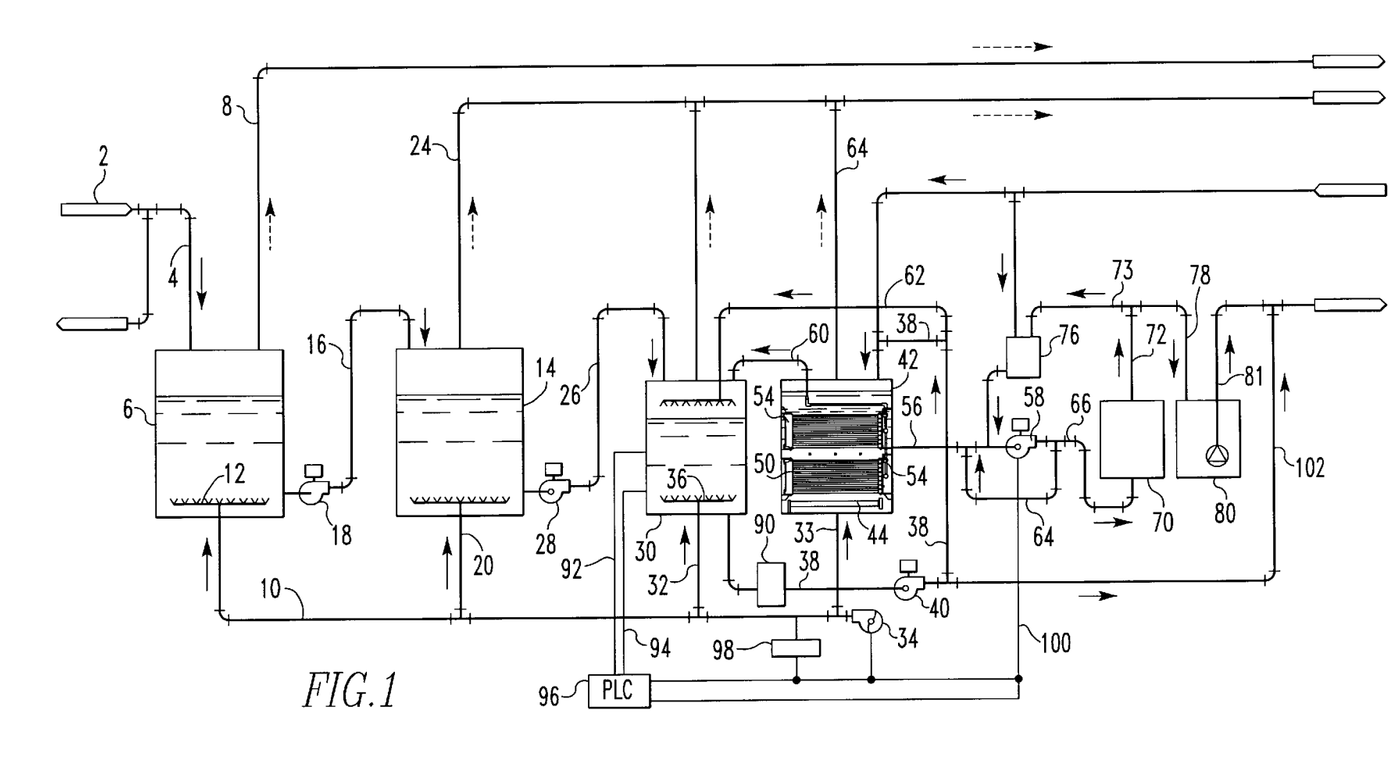
FIG. 1 is a flow chart showing steps of the shipboard waste treatment system in accordance with the invention.

In the present invention there is provided a process and system for wastewater or sewage treatment including both black water (sewage) and gray water (wastewater from showers, sinks, kitchens, etc.) treatment. In the invention, wastewater 2 is directed along line 4 to collection tank 6. Tank 6 which is closed is vented to the atmosphere along line 8. Air, oxygen, or oxygen-containing gas can be introduced to tank 6 along line 10 for purposes of mixing and ensuring the wastewater stays aerobic. The air or oxygen-containing gas is distributed in tank 6 using distributor 12. Because of the irregular flow patterns of wastewater in an onboard ship system, an equalization tank 14, which is also closed, can be provided and is usually required if no collection tank is available to promote homogeneity of wastewater. Alternatively, a variable level bioreactor may be used to accommodate the irregular flow patterns of wastewater on board ship. Thus, wastewater from collection tank 6 can be directed along line 16 to equalization tank 14 using feed pump 18. Pump 18 may be of the type which also provides grinding action to comminute solids in the wastewater. Air can be supplied along line 20 to equalization tank 14 using air blower 34. Air or gases are vented from tank 14 along line 24 to the atmosphere. Wastewater or influent from equalization tank 14 is directed along line 26 using pump 28 to bioreactor tank 30. Pump 28 may be of the type that also provides comminution of solids in wastewater.

For purposes of operation, oxygen-containing gas or air is introduced along line 32 to bioreactor 30 using air pump or blower 34 and distributed through gas distribution means 36. Typically, untreated waste, e.g., water and sewage, introduced to bioreactor 30 has a dissolved oxygen content of less than 3 mg/l.

Further, for purposes of operating the bioreactor in accordance with the invention, the mixed liquor is maintained at a solids content of at least 5 g/l. By the term "mixed liquor" as used herein is meant the wastewater or influent in bioreactor 30 containing suspended solids. Further, in accordance with the present invention, the bioreactor is operated so that the solids will increase or build up in the reactor. However, the mixed liquor is controlled so that the solids do not exceed a maximum of 30 g/l and preferably less than 25 g/l, as will be explained herein. In addition, sufficient oxygen-containing gas is introduced to bioreactor 30 so that the solids are not permitted to settle and to promote oxidation of the organic substance in a relatively short period of time.

Mixed liquor is transferred from bioreactor 30 along line 38 through mixed liquor pump 40 to closed container 42 which houses hollow fiber micro- or ultra-filtration membrane modules 50. Membranes in modules 50 are maintained under partial vacuum to remove water from the mixed liquor as purified water or permeate. Container 42 is maintained sufficiently full of mixed liquor to avoid exposure of the membranes to air as the ship tilts or rolls as a result of wave motion. The hollow fiber membranes are shown disposed substantially in the horizontal position as depicted more clearly in FIG. 2 and explained hereinbelow. However, the hollow fiber membranes may be used in the vertical position or any angle in between provided they are covered with mixed liquor and are effectively contacted with bubbles of gas, as explained herein. As water is extracted as permeate through membranes 50, concentrate higher in solids remains and is recirculated back to bioreactor 30 through conduit 60. The recirculation of concentrate or mixed liquor from the hollow fiber membranes has the advantage of removing concentrate from the hollow fiber membranes and replenishing it with fresh mixed liquor. Further, the recirculation has the advantage of maintaining container 42 substantially full with freedom from membrane exposure to air.

Oxygen-containing gas is introduced from air blower 34 along line 33 and flowed through dispenser 44 to provide a bubble pattern which contacts hollow fiber membranes at a substantially perpendicular angle. For purposes of onboard ship treatment, the direction of the air bubbles to contact the hollow fiber membranes is an important feature compared to conventional systems.

From FIG. 1, it will be seen that stream of mixed liquor feed stream 38 is divided and a portion thereof is recirculated along line 62 to bioreactor 30. The recirculated portion directed along line 62 is introduced to bioreactor 30 as a spray and aids in minimizing foam as well as adding oxygen to the system.

Air or gas is removed from container 42 along line 64 and diverted to the atmosphere.

Purified water or permeate is withdrawn from hollow fiber membrane modules 50 through manifolds 54 and along line 56 by permeate pump 58. Permeate water may be recirculated along line 64 from line 66 to prevent cavitation of pump 58. Permeate water may be directed along line 66 to disinfection unit 70 where the permeate is subjected to UV or other disinfecting means. Disinfected water from tank 70 is directed along line 72 and line 73 to backpulse tank 76, or the disinfected water can be directed from line 72 to line 78 and into sump tank 80 as treated or disinfected permeate water. The water from sump tank 80 can be removed along line 81 and dumped as treated effluent.

Typical shipboard liquid waste, including black water and gray water, has suspended solids in the range of 400 to 1500 mg/l, biological oxygen demand (BOD) 400 to 2000 mg/l, total organic carbon (TOC) 200 to 500 mg/l. During sailing, typically flow rates for gray water onboard ship are 8–15 m³/day comprised of water from showers, sinks, laundry and kitchen, and typical black water discharged from toilets is about 2.5 to 3 m³/day. For purposes of discharge, permeate or treated effluent typically should have a BOD of less than 10 mg/l and less than 10 mg/l of suspended solids.

Figure 2:
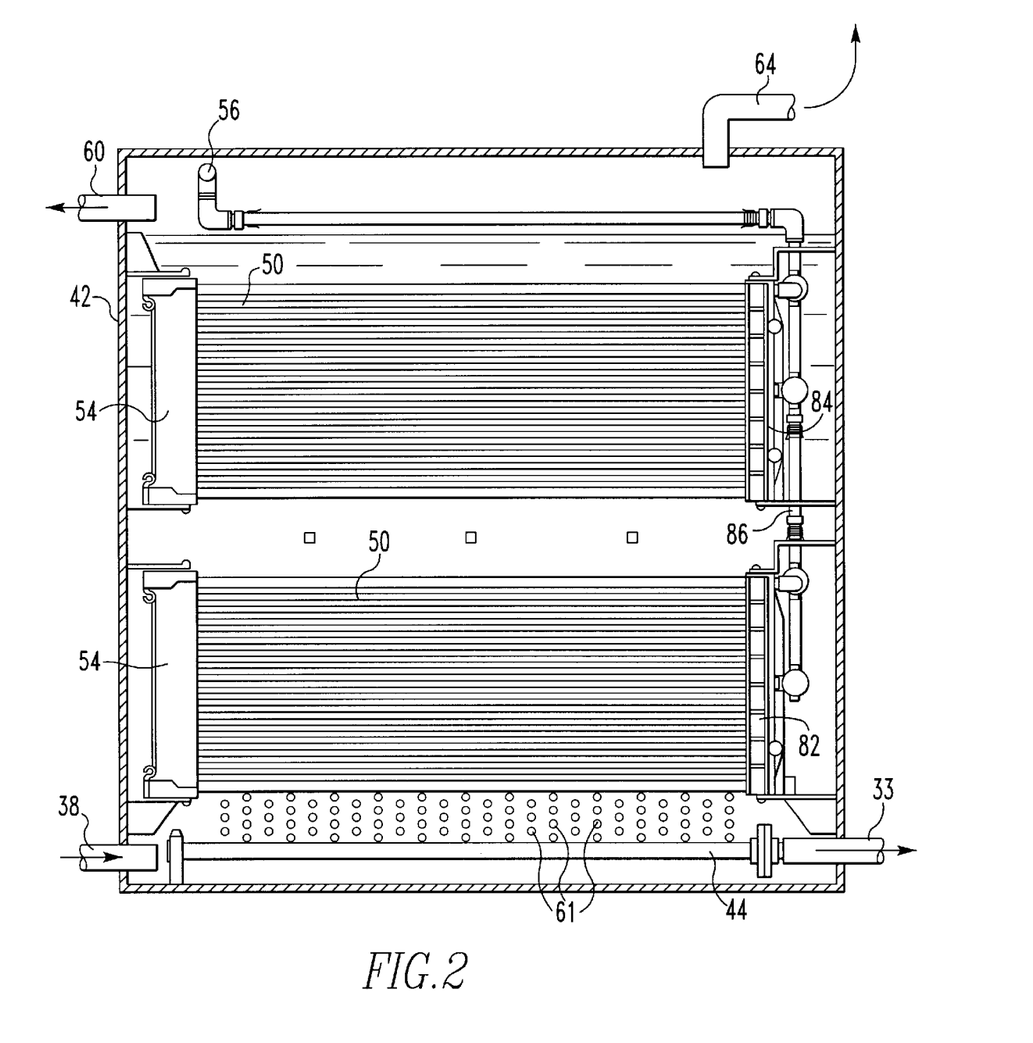
FIG. 2 is a cross-sectional view of the submerged hollow fiber membrane.

Referring now to FIG. 2, there is shown a microfiltration unit having two hollow fiber modules 50 shown disposed horizontally in container 42. The modules 50 are positioned one above the other. Influent or mixed liquor is introduced through conduit 38 and excess influent along with concentrate is removed through pipe 60 and returned to the bioreactor. Water or permeate is removed from the mixed liquor hollow fiber membrane modules 50 where it flows into manifolds or headers 54, 82 and 84. Pipe 86 connects headers 82 and 84 as well as to headers 54 (not shown) and the permeate flows upwards and into pipe 56 and is removed to the disinfection unit 70 (see FIG. 1).

For purposes of filtration, either microfiltration or ultrafiltration membranes may be used, and if high quality water is desired, the permeate may be treated using a reverse osmosis membrane.

In filtration unit 50, it is preferred to use membranes having a pore size smaller than 1 $\mu$m and more preferably less than 0.5 $\mu$m, with a typical pore size for the membrane being in the range of 0.001 to 1 $\mu$m.

As shown in FIG. 2, the hollow fiber membranes extend substantially horizontally from headers 54 to headers 82 and 84, respectively. Thus, the membrane module is comprised of a multiplicity of hollow fibers, through which the flux reaches a constant relatively high value. For use in tank 42, the hollow fibers extend preferably greater than 0.5 meter long, and provided a surface area preferably greater than 10 m². The terminal end portions of fibers in each header are substantially free from fiber-to-fiber contact. Pump 58 induces a suction on the fibers to provide the trans-membrane pressure differential of the fiber wall. Preferred fibers operate with a trans-membrane pressure differential in the range of about 0.5 psi to about 25 psi and typically 1 to 20 psi.

Preferred hollow fibers are made of organic polymers and ceramics whether isotropic, or anisotropic, with a thin layer or skin on the outside surface of the fibers. Some fibers may be made from braided polymer covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein. Preferred ceramic fibers are made from alumina by E.I. duPont deNemours Co. and disclosed in U.S. Pat. No. 4,069,157.

For hollow fiber membranes, the outside diameter of a fiber is at least 20 $\mu$m and may be as large as about 3 mm, typically being in the range from about 0.1 mm to 2 mm. The larger the outside diameter the less desirable the ratio of surface area per unit volume of fiber. The wall thickness of a fiber is at least 5 $\mu$m and may be as much as 1.2 mm, typically being in the range from about 15% to about 60% of the outside diameter of the fiber, most preferably from 0.2 mm to 1.2 mm.

The average pore cross-sectional diameter in a fiber may vary widely, being in the range from about 5 to 10,000 Å.

The preferred pore diameter for ultrafiltration is in the range from about 5 to 1,000 Å; and for microfiltration, in the range from 1,000 to 10,000 Å.

Typically, fibers range from 1 m to about 5 m long, depending upon the dimensions of the body of substrate (depth and width) in which the bundle or array of fibers are deployed. If the fibers are disposed in the vertical position, then the length would be considerably less than 5 m long and typically less than 2 m long.

The number of fibers in an array or module is arbitrary, typically being in the range from about 1,000 to about 10,000, and the preferred surface area for an array is in the range from 10 m² to 100 m².

An important feature of the present invention is the horizontally disposed bundle of hollow fiber membranes 50. In addition, another important feature is location of aerator 44 disposed underneath the bundle of hollow fiber membranes. That is, it has been discovered that the conventional use of bundles of hollow fiber membranes for applications such as on shipboard resulted in frequent fouling of the membrane. This meant that the system had to be shut down, severely interfering with the efficiency of the system. When the ship rolls, it has been discovered that as little as 10 degrees from vertical resulted in the membrane fouling because of poor contact of the hollow fiber membranes with air bubbles. It was discovered that a large portion of the air bubbles would fail to contact the hollow fiber membranes and thus fouling resulted. Thus, it is an important consideration to ensure that the air bubbles contact the hollow fiber membranes or other means is used to prevent fouling. Onboard ship, when there is constant pitch and roll at sea, very poor contact of the hollow fiber membranes can be experienced. This can result in membrane fouling and shut down of the system. Thus, locating or positioning the bundle of hollow fiber membranes 50 substantially horizontally and having an aerator 44 disposed beneath the bundle, as shown in FIG. 2, resulted in substantial freedom from fouling of the membranes. As shown in FIG. 2, aerator 44 preferably extends the length of the membrane. The ship can pitch and roll substantially and yet the air bubbles from the aerator still contact the membranes and surprisingly extend the useful life of membranes. For application on shipboard, this is a marked advance. As will be seen from FIG. 2, aerator 44 is not coupled to the membrane bundle which greatly facilitates changing of the bundles during maintenance. Further, horizontally disposed fiber bundles overcome the problem of the height limitation on ships. In the horizontal position, there is no build-up of fibers such as hair or solids and thus membrane remains clean. This is a marked advantage because it minimizes downtime for maintenance.

Aerator 44 can be comprised of a porous sleeve which can supply a consistent volume and size of bubble 61 independent of the motion of the ship. Bubbles 61 rising from the aerator may be directed to the bundles of fibers which assures that the critical area of the fiber bundles are prevented from fouling.

The size of air bubble generated by aerator 44 is an important aspect of the invention. That is, it has been found relatively coarse air bubbles are more effective in cleaning in the membranes. Thus, preferably the bubbles emanating from aerator 44 have a size in the range of 0.5 to 5 mm in diameter. This can be achieved by maintaining the porous sleeve aerator under relatively high air pressure.

Application of air to the hollow fiber membranes may be provided continuously or intermittently, better results generally being obtained with continuous air flow. The amount of air provided depends upon the type of substrate and the susceptibility of the surfaces of the fibers to plugging. Air typically is added continuously at a rate of 0.005 to 0.5 ft$^3$/min/ft$^2$ of membrane surface. If the air is added intermittently, the same rates can apply and the interval may be 10 seconds to 1 minute.

Another membrane module employing hollow fiber membranes suitable for use in the present invention is disclosed in U.S. Pat. No. 5,639,373, incorporated herein by reference as if specifically set forth.

It will be noted that the bundles of hollow fiber membranes are isolated from bioreactor 30. This has the advantage that the membrane bundles 50 can always be submerged with biomass or mixed liquor, regardless of the level in the bioreactor, and further, the bundles are always submerged regardless of the ship's motion. Further, this has the advantage of permitting or maintaining aerated sludge in the bioreactor when permeate extraction is not required. In addition, it has the advantage of permitting rinsing of the membrane compartment and cleaning of the membranes including soaking or backflushing in the absence of biomass at low demand times on ship, such as nighttime. Further, it facilitates replacement of membrane modules or bundles, if necessary, without interrupting the bioreactor operation.

The membranes may be easily cleaned by treating with sodium hypochlorite, for example. The cleaning may be performed on a routine basis and doses of cleaning fluid applied automatically. After cleaning, any residual chemicals, e.g., sodium hypochloride, may be displaced into the bioreactor without interfering with the bioreactor operation because of the small amount.

Onboard ship systems differ from land-based systems in that the onboard ship systems are subject to many shut down or standby situations, for example, when the ship is in port or on the high seas. Thus, it is important to have an onboard treatment system that can be started particularly from a standby situation within a few hours when the ship is leaving port. This may be compared to a dry start from a shutdown situation which requires a much longer time.

In a dry start situation, the reactor is first partially filled with black water only, starting usually about 4 to 8 days before operation is required. Black water for startup is usually available from equalization tank 14. However, any source may be used. Aeration is commenced and sludge growth and respiration is monitored using a DO meter and suspended solids meter, for example. Black water is added as required. Black water may be supplemented by adding powdered milk or other synthetic cultures. These additions are made until the biomass in the bioreactor has a suspended solids content of about 5 g/l. When this level is reached, continuous feed of black water and gray water may be commenced. A computer control may be used to facilitate the start by adjusting the addition of black water and air required to obtain the required level of biomass before continuous feed is commenced. After start of the bioreactor, mixed liquor or biomass is directed to hollow fiber membrane module container 42 to extract permeate. Further, solids are increased in the bioreactor until a level of preferably not greater than 25 g/l solids is reached. Under typical operation, the time period to reach 25 g/l suspended solids can require 20 days.

The hollow fiber membranes are particularly suited to onboard wastewater treatment systems. For example, increased hydraulic loading up to double the design capacity for the system can be achieved by increasing transmembrane pressure. Further increases in capacity can be achieved by increasing the number of hollow fiber membrane modules. That is, up to four time the average capacity for the system can be achieved by doubling the number of membrane modules.

While the treatment system has been described with respect to starting from dry starts, it should be understood that is can be started from a standby condition in a few hours, e.g., 5 or 6 hours. This condition is particularly useful when the ship is leaving port with a passenger load. Thus, in the standby mode, the bioreactor contains about ¼ to ¾ full, e.g., typically ½ full, of partially active or stored biomass having minimal air or oxygen supply to maintain the biomass in the partially active state. For purposes of activating the biomass, a small quantity of materials such as black water or powdered milk added. Further amounts of nutrients are added along with a source of oxygen, depending on DO readings and total suspended solids. Once the reactor is full, both black water and gray water is added on a continuous basis. Flow is directed to membrane container 42 and permeate is extracted with excess concentrate recirculated back to bioreactor 30.

It will be appreciated that organic loading of the bioreactor can peak at the same time as hydraulic loading. For purposes of treating the increased organic loading during increased hydraulic loading, oxygen or oxygen-enriched air can be used. The oxygen-enriched air can be generated on board ship by pressure swing adsorption (PSA) or vacuum pressure swing adsorption (VPSA) and introduced to bioreactor 30 through gas distribution means 36. The oxygen-enriched air may be incorporated under pressure into mixed liquor from the bioreactor utilizing an eductor (not shown) wherein the oxygen readily dissolves. The oxygen-enriched mixed liquor is reintroduced to the bioreactor using a multi-nozzle distribution system to assure high oxygen utilization. Thus, high organic loading and high hydraulic rates can be processed in accordance with the invention. It should be understood that oxygen or oxygen-enriched air may be used under normal operation to reduce the air flow through the bioreactor which reduces foam, for example.

The bioreactor may be operated in a cyclic manner. That is, oxygen-enriched air flowing to the bioreactor is stopped periodically during periods of PSA or VPSA bed generation. It will be appreciated that interruption of oxygen flow provides anoxic conditions and thus is beneficial because it results in removal of total nitrogen in the bioreactor. Cyclic operation of the bioreactor is beneficial in yet another way. That is, oxygen storage is no longer required which results in space savings. Thus, it will be seen that the use of PSA or VPSA provides for cyclic operation of the bioreactor which permits nitrogen removal during one phase and permits aerobic operation during a second phase or cycle. Using oxygen-enriched air or gas results in 80% of the oxygen being adsorbed and total oxygen absorption efficiency can be as high as 90%. This is advantageous because it improves bioreactor efficiency which aids in offsetting low bioreactor height as mandated by onboard ship restrictions. The bioreactor can be operated at temperatures in the range of 5° to 45° C.

Because oxygen-enriched gas or air flow rates are relatively low compared to air, substantially no foaming is encountered.

It will be appreciated that if a continuous supply of oxygen-enriched gas or air is desired, two PSA or VPSA units can be used. Thus, one PSA or VPSA unit can be used to supply oxygen while the second unit is operating in the regeneration mode.

By the use of oxygen-containing gas or oxygen-enriched gas is meant to include air as well as oxygen gas.

The present invention has the advantage that it does not require settling tanks. Instead, the system in accordance with the invention permits the use of the bioreactor to operate at a suspended solids level of at least 5 g/l to about 25 or 30 g/l. Thus, the bioreactor is used as a sludge storage device and typically can operate up to twenty (20) days before being regenerated.

Thus, in operation, the system is operated until suspended solids are accumulated to a level of not greater than 25 or 30 g/l. Thereafter, flow of black water and gray water to the bioreactor is terminated and collected in the collection tank 6 or equalization tank 14. Usually, it is convenient to terminate flow to bioreactor 30 onboard ship at nighttime when flow rates are minimal. Further, flow of mixed liquor or biomass to membranes 50 may be terminated. Thereafter, mixed liquor having high solids content in the bioreactor is removed leaving a residual of not less than about a quarter of the original operating volume. That is, preferably about ¾ of the operating volume of high, suspended solids mixed liquor is removed or pumped from the bioreactor, thus leaving about ¼ active biomass. The high solids mixed liquor may be removed from the bioreactor along lines 38 and 102 to a sump. It will be understood that lesser amounts of biomass can be removed from the bioreactor 30 but usually on a less preferred basis. Thus, typically about ½ to about ¾ of the volume of the biomass is removed, thereby leaving about ¼ to about ½ active biomass. Upon operation, again, black water and gray water are introduced to the ¼ residual active biomass and thus, the suspended solids concentration is diluted from the high concentration, e.g., 25 or 30 g/l, down to about 5 g/l. Thereafter, on continuing operation, the suspended solids concentration is again increased to not more than 30 g/l, preferably less than 25 g/l. It will be understood that the system can be operated on a continuous basis through these cycles with only down time required for routine maintenance, thus providing a novel process for wastewater, on-board ship, treatment system.

Operating the treatment system in this manner has the advantage that it permits a ship to operate for a number of days without discharging in restricted areas. When the ship reaches open waters or deep oceans where the discharge is not restricted, it can reduce the concentration to less than about 15 g/l. Further, before reaching the next sensitive area, it can once again reduce the concentration in the bioreactor to about 5 g/l or less to permit operation in the sensitive area until it reaches port where discharge can be made at a treatment plant.

During periods of removing the high concentration of suspended solids from the bioreactor, membrane filtration in container 42 can be continued or stopped. If it is continued, care must be taken to ensure that sufficient flow is provided to container 42 to maintain the membranes submerged.

On the on-board ship system, insoluble materials such as cloth, paper, plastic, hair and fibrous material can interfere with the operation of the system. That is, these materials, if not removed, can be seriously diminish the effectiveness of the membrane module. For example, if not removed, the hair, for example, can form tangled rope-like filaments in the bioreactor and subsequently become entangled in the hollow fiber membranes of module 50, greatly interfering with their effectiveness. Further, ropes of hair can still form even after passing through grinder pumps 18 and 28. Screening of the wastewater, while effective in removing some insoluble material, is not effective in removing hair and often results in clogging. However, it has been discovered that a vibratory screen is effective in removing hair. The vibratory screen operates to form agglomerations of hairs or fibers. The agglomerations are continuously cast to the side of the screen and collected as a result of the vibratory motion and thus prevent the screen from clogging. The vibratory screen is conveniently located at 90 (FIG. 1) between the bioreactor and membrane module container 42. Typically, a screen size of about 254 $\mu$m (opening size) has been found to be effective in removing hair on a vibratory screen. It will be appreciated that a range of opening size may be employed from about 50 $\mu$m to 2 mm.

Because of the irregular flow patterns on-board ship resulting from the periods of peak organic loading and hydraulic loading, it is advantageous to monitor the biomass in bioreactor 30 using a DO (dissolved oxygen) meter or probe and suspended solids meter to measure respiration rate and sludge growth rate. The measurements made by the DO meter and/or the suspended solids monitor are relayed along lines 92 and 94 to a controller 96 such as a programmable logic controller. The programmable logic controller is set up to compare the DO readings with prior DO readings to determine that the DO is maintained in a controlled range. The programmable logic controller determines if additional oxygen to the biomass is required to maintain the DO control range. If the organic loading to the bioreactor is increased, this results in the DO level decreasing and thus increased amounts of oxygen is required to be supplied to the bioreactor. If the determination is made by controller 96 that more oxygen is required, then a signal is sent to air pump 34 to increase the flowrate of air to the biomass in reactor 30. With use of valving, air to membranes 50 in container 42 may be maintained the same or increased proportionally, depending on the loading to bioreactor 30. If the organic loading is exceptionally high, then a signal can be relayed to device 98 from controller 96 to add increased levels of oxygen. Device 98 can be stored oxygen or a pressure swing adsorption (PSA) or vacuum pressure swing adsorption (VPSA) device. This has the effect of adjusting the level of oxygen to the control range as required for increased respiration. It will be appreciated that programmable logic controller 96 can be programmed to calculate the increased amount of oxygen or air to be added to the biomass. Continuous monitoring of the biomass by DO meter provides programmable logic controller 96 with information respecting the DO level and permits determination by programmable logic controller 96 whether the DO level should be increased or decreased.

Concurrently with increased organic loading, increased hydraulic loading can occur. Thus, it may be necessary to increase the rate of removal of permeate being removed from the system. Thus, programmable logic controller 96 can control the rate of permeate removal from membrane modules 50 by signaling along line 100 to increase the vacuum created by permeate pump 58. By increasing the rate of pump 58, a greater pressure drop is created across the membrane and thus increased amounts of permeate can be extracted.

In addition, controller 96 can be set up to monitor the level of suspended solids in bioreactor 30. This provides control of suspended solids to maintain the minimum amount and to ensure that the maximums are adhered to. Thus, the suspended solids monitor permits scheduling and predicting operation of the wastewater treatment system aboard ship to provide for management of the suspended solids.

While the invention has been described in terms of preferred embodiments, the claims appended hereto are intended to encompass other embodiments which fall within the spirit of the invention.

What is claimed is:

1. A method for treating wastewater in an onboard ship treatment system having controlled suspended solids, the method comprising the steps of:
   (a) providing wastewater in a bioreactor to oxidize organic material contained in said wastewater by adding oxygen-containing gas thereto;
   (b) operating said bioreactor to provide a mixed liquor having a solids concentration of at least 5 g/l;
   (c) continuously increasing said solids concentration in said mixed liquor in said bioreactor to not greater than 30 g/l;
   (d) when the solids concentration in said mixed liquor reaches at least 15 g/l, removing a portion of the mixed liquor from said bioreactor;
   (e) thereafter adding wastewater to said bioreactor to decrease said solids concentration of remaining mixed liquor to not less than 5 g/l;
   (f) then further operating said bioreactor to increase said solids content again;
   (g) providing a module having an array of hollow fiber membranes in a membrane container in liquid communication with said bioreactor;
   (h) sweeping said hollow fiber membranes with gas;
   (j) directing a flow of mixed liquor from said bioreactor to said container to cover said membranes to avoid substantial exposure of said hollow fibers membrane during motion of said ship;
   (k) returning concentrate and mixed liquor from said hollow fiber membrane container to said bioreactor; and
   (l) removing purified water from said mixed liquor through said hollow fiber membranes as permeate to provide treated effluent.

2. The method in accordance with claim 1 wherein said oxygen-containing gas is oxygen or is oxygen-enriched air.

3. The method in accordance with claim 1 including sweeping said hollow fiber membranes with air bubbles.

4. The method in accordance with claim 1 including the step of screening said wastewater using a vibrating screen to remove fibrous material to avoid entanglement of said fibrous material with said hollow fiber membranes.

5. The method in accordance with claim 1 including continuously increasing said solids content in said bioreactor to a concentration level of not greater than 25 g/l.

6. The method in accordance with claim 1 including operating said bioreactor until said solids concentration reaches a level of at least 20 g/l prior to removing a portion of the mixed liquor from the bioreactor.

7. The method in accordance with claim 1 including collecting said wastewater in a collection tank and then transferring said wastewater to said bioreactor.

8. The method in accordance with claim 1 wherein said hollow fiber membranes employ a trans-membrane pressure differential in the range of 0.5 to 25 psi to draw permeate through said membrane.

9. The method in accordance with claim 1 including the step of increasing said solids concentration to not greater than 25 g/l in a period of about 10 to 20 days.

10. The method in accordance with claim 1 wherein said removing a portion includes the step of removing from about ½ to about ¾ of the volume of said liquor from said bioreactor and leaving about ¼ to ½ residual mixed liquor having a solid concentration of at least 15 g/l.

11. The method in accordance with claim 1 including the step of applying air on a continuous basis to said membrane at a rate of about 0.005 to 0.5 ft$^3$/min/ft$^2$ of membrane surface.

12. The method in accordance with claim 1 including adding air from a gas-dispersing means, the air having a bubble size in the range of 0.5 to 5 mm.

13. The method in accordance with claim 1 including disposing said hollow fiber membranes substantially horizontally in said membrane container and dispersing said gas from underneath said hollow fiber membranes.

14. A method for treating wastewater in an onboard ship sewage treatment system having controlled suspended solids, the method comprising the steps of:
   (a) collecting wastewater in a collection tank;
   (b) transferring said wastewater to a bioreactor to oxidize organic material contained in said wastewater by adding oxygen or oxygen-enriched air thereto;
   (c) operating said bioreactor to provide a mixed liquor having a solids concentration of at least 5 g/l;
   (d) continuously increasing said solids concentration in said mixed liquor in said bioreactor to not greater than 25 g/l;
   (e) when the solids concentration in said mixed liquor reaches at least 15 g/l, removing about ½ to about ¾ of the volume of said mixed liquor from said bioreactor to provide a residual mixed liquor;
   (f) thereafter adding wastewater to said bioreactor to decrease said solids concentration of residual mixed liquor to not less than 5 g/l;
   (g) then further operating said bioreactor to increase said solids content again;
   (h) providing a hollow fiber membrane module container in liquid communication with said bioreactor;
   (i) disposing a hollow fiber membrane module substantially horizontally in said membrane container;
   (j) locating a gas dispersing means in said container beneath said hollow fiber membrane for gas sweeping said hollow fibers with air;
   (k) directing a flow of mixed liquor from said bioreactor to said container to cover said membranes to avoid substantial exposure of said hollow fibers membrane during motion of said ship;
   (l) returning concentrate from said hollow fiber membrane container to said bioreactor; and
   (m) removing purified water from said mixed liquor through said hollow fiber membranes as permeate to provide treated effluent.

15. The method in accordance with claim 14 including the step of screening said wastewater using a vibrating screen to remove fibrous material to avoid entanglement of said fibrous material with said hollow fiber membranes.

16. The method in accordance with claim 14 including operating said bioreactor until said solids concentration reaches a level of at least 20 g/l prior to removing a portion of the mixed liquor from the bioreactor.

17. The method in accordance with claim 14 wherein said treated effluent has a BOD of less than 10 mg/l.

18. The method in accordance with claim 14 wherein said hollow fiber membranes employ a trans-membrane pressure differential in the range of 0.5 to 25 psi to draw permeate through said membrane.

19. The method in accordance with claim 14 including the step of applying air on a continuous basis to said membrane at a rate of about 0.005 to 0.5 ft$^3$/min/ft$^2$ of membrane surface.

20. The method in accordance with claim 14 including adding air from said gas-dispensing means, the air having a bubble size in the range of 0.5 to 5 mm.

21. An onboard ship sewage treatment system for treating wastewater, the system having controlled suspended solids, the system comprised of:
- (a) a collection tank for collecting wastewater;
- (b) a bioreactor in liquid communication with said collection tank for receiving wastewater, said bioreactor designed to oxidize organic material contained in said wastewater by adding oxygen-containing gas thereto, said bioreactor designed:
  - (i) to be operated at a mixed liquor having a solids concentration of at least 5 g/l;
  - (ii) to continuously increase said solids concentration in said mixed liquor in said bioreactor to not greater than 30 g/l;
  - (iii) for removing a portion of the mixed liquor from said bioreactor when the solids concentration in said mixed liquor reaches at least 15 g/l;
  - (iv) to decrease said solids concentration of remaining mixed liquor to not less than 5 g/l by adding wastewater thereto; and
  - (v) for further operating said bioreactor to increase said solids content again;
- (c) a hollow fiber membrane module container in liquid communication with said bioreactor;
- (d) a fiber membrane module disposed substantially horizontally in said membrane container;
- (e) a gas dispersing means located in said container beneath said hollow fiber membrane module designed for sweeping said hollow fibers with gas, said container designed to receive mixed liquor from said bioreactor to a level which covers said membranes to avoid substantial exposure of said hollow fibers membrane during motion of said ship;
- (f) a concentrate return line for returning concentrate from said hollow fiber membrane container to said bioreactor; and
- (g) means for producing a reduced pressure on the inside of said hollow fiber membranes for removing purified water from said mixed liquor through said hollow fiber membranes as permeate to provide treated effluent.

22. The system in accordance with claim 20 including a vibrating screen for screening said wastewater prior to entering said membrane container to remove fibrous material to avoid entanglement of said fibrous material with said hollow fiber membranes.

23. A method for treating wastewater in an onboard ship treatment system having controlled suspended solids, the method comprising the steps of:
- (a) providing said wastewater in a bioreactor to oxidize organic material contained in said wastewater by adding oxygen-containing gas thereto;
- (b) operating said bioreactor to provide a mixed liquor having a solids concentration of at least 5 g/l, the bioreactor capable of being operated by increasing said solids concentration in said mixed liquor in said bioreactor to not greater than 30 g/l;
- (c) when the solids concentration in said mixed liquor reaches at least 15 g/l, removing a portion of the mixed liquor from said bioreactor;
- (d) thereafter adding wastewater to said bioreactor to decrease said solids concentration of remaining mixed liquor to not less than 5 g/l;
- (e) then further operating said bioreactor;
- (f) monitoring the dissolved oxygen (DO) content of said mixed liquor to provide a DO measurement;
- (g) relaying said DO measurement to a logic controller;
- (h) in said logic controller, comparing said DO measurement to previous DO measurements to provide a comparison;
- (i) in response to said comparison, maintaining or changing feed rate of said oxygen-containing gas to said mixed liquor to accommodate changes in organic flow rate to said bioreactor;
- (j) providing a hollow fiber membrane module container in liquid communication with said bioreactor;
- (k) disposing a hollow fiber membrane module in said membrane container;
- (l) locating a gas dispersing means in said container for sweeping said hollow fibers with gas;
- (m) directing a flow of mixed liquor from said bioreactor to said container to cover said membranes to avoid substantial exposure of said hollow fibers membrane during motion of said ship;
- (n) returning concentrate from said hollow fiber membrane container to said bioreactor; and
- (o) removing purified water from said mixed liquor through said hollow fiber membranes as permeate to provide treated effluent.

24. The method in accordance with claim 23 wherein said oxygen-containing gas is air.

25. The method in accordance with claim 23 including sweeping said hollow fiber membranes with air.

26. The method in accordance with claim 23 including the step of screening said wastewater prior to said membrane module container using a vibrating screen to remove fibrous material to avoid entanglement of said fibrous material with said hollow fiber membranes.

27. The method in accordance with claim 23 including operating said bioreactor to increase said solids content to a concentration level of not greater than 25 g/l.

28. The method in accordance with claim 23 including operating said bioreactor until said solids concentration reaches a level of at least 20 g/l prior to removing a portion of the mixed liquor from the bioreactor.

29. The method in accordance with claim 23 wherein said treated effluent has a BOD of less than 10 mg/l.

30. The method in accordance with claim 23 wherein said hollow fiber membranes employ a trans-membrane pressure differential in the range of 0.5 to 25 psi to draw permeate through said membrane.

31. The method in accordance with claim 23 including the step of increasing said solids concentration to not greater than 25 g/l in a period of about 10 or 20 days.

32. The method in accordance with claim 23 wherein said removing a portion includes the step of removing from about ½ to about ¾ of the volume of said liquor from said bioreactor and leaving about ¼ to ½ residual mixed liquor having a solid concentration of at least 15 g/l.

33. The method in accordance with claim 23 including the step of applying air on a continuous basis to said membrane at a rate of about 0.005 to 0.5 ft$^3$/min/ft$^2$ of membrane surface.

34. The method in accordance with claim 23 including adding air from said gas-dispersing means, the air having a bubble size in the range of 0.5 to 5 mm.

35. A method for treating wastewater in an onboard ship treatment system having controlled suspended solids, the method comprising the steps of:
- (a) providing wastewater in a bioreactor to oxidize organic material contained in said wastewater by adding oxygen-containing gas thereto;

(b) operating said bioreactor to provide a mixed liquor having a solids concentration of at least 5 g/l;

(c) permitting said solids concentration in said mixed liquor in said bioreactor to increase during said operating to not greater than 25 g/l;

(d) when the solids concentration in said mixed liquor reaches at least 15 g/l, removing about ½ to about ¾ of the volume of said mixed liquor from said bioreactor to provide a residual mixed liquor;

(e) thereafter adding wastewater to said bioreactor to decrease said solids concentration of residual mixed liquor to not less than 5 g/l;

(f) then further operating said bioreactor to increase said solids content again;

(g) monitoring the dissolved oxygen (DO) content of said mixed liquor to provide a DO measurement;

(h) relaying said DO measurement to a logic controller;

(i) in said logic controller, comparing said DO measurement to previous DO measurements to provide a comparison;

(j) in response to said comparison, maintaining or changing feed rate of said oxygen-containing gas to said mixed liquor to accommodate changes in organic flow rate to said bioreactor;

(k) providing a hollow fiber membrane module container in liquid communication with said bioreactor;

(l) disposing a hollow fiber membrane module substantially horizontally in said membrane container;

(m) locating a gas dispersing means in said container beneath said hollow fiber membrane for sweeping said hollow fibers with gas;

(n) directing a flow of mixed liquor from said bioreactor to said container to cover said membranes to avoid substantial exposure of said hollow fibers membrane during motion of said ship;

(o) returning concentrate from said hollow fiber membrane container to said bioreactor; and (p) removing purified water from said mixed liquor through said hollow fiber membranes as permeate to provide treated effluent.

36. A method for treating wastewater in an onboard ship treatment system wherein mixed liquor having high solids content generated in the system is discharged periodically, the method comprising the steps of:

(a) introducing wastewater to a bioreactor to oxidize organic material contained in said wastewater by adding oxygen-containing gas thereto;

(b) operating said bioreactor to provide a mixed liquor having a solids concentration of at least 5 g/l and to increase said solids concentration in said mixed liquor to not greater than 25 g/l;

(c) when the solids concentration in said mixed liquor reaches at least 15 g/l, removing a portion of the mixed liquor from said bioreactor and adding wastewater to said bioreactor to obtain a solids concentration of not less than 5 g/l;

(d) monitoring the dissolved oxygen (DO) content of said mixed liquor to provide a DO measurement;

(e) relaying said DO measurement to a logic controller;

(f) in said logic controller, comparing said DO measurement to previous DO measurements to provide a comparison;

(g) in response to said comparison, maintaining or changing feed rate of said oxygen-containing gas to said mixed liquor to accommodate changes in organic flow rate to said bioreactor;

(h) providing a hollow fiber membrane module container in liquid communication with said bioreactor, said container having:
  (i) a hollow fiber membrane module disposed therein; and
  (ii) gas dispersing means in said container for sweeping said hollow fibers with gas;

(i) directing a flow of mixed liquor from said bioreactor to said container to maintain said container sufficiently full to avoid substantial exposure of said hollow fiber membranes during ocean motion of said ship;

(j) returning concentrate from said hollow fiber membrane container to said bioreactor; and (kl) removing purified water from said mixed liquor through said hollow fiber membranes as permeate to provide treated effluent.

37. A method for treating wastewater in an onboard ship treatment system wherein mixed liquor having high solids content generated in the system is discharged periodically, the method comprising the steps of:

(a) providing wastewater to a bioreactor to oxidize organic material contained in said wastewater by adding oxygen-containing gas thereto;

(b) operating said bioreactor to provide a mixed liquor having a solids concentration of at least 5 g/l and not greater than 25 g/l;

(c) monitoring the dissolved oxygen (DO) content of said mixed liquor to provide a DO measurement;

(d) relaying said DO measurement to a logic controller;

(e) in said logic controller, comparing said DO measurement to previous DO measurements to provide a comparison;

(f) in response to said comparison, maintaining or changing feed rate of said oxygen-containing gas to said mixed liquor to accommodate changes in organic flow rate to said bioreactor;

(g) providing a hollow fiber membrane module container in liquid communication with said bioreactor, said container having:
  (i) a hollow fiber membrane module disposed therein; and
  (ii) gas dispersing means in said container disposed for sweeping said hollow fibers with gas;

(h) directing a flow of mixed liquor from said bioreactor to said container to maintain said container sufficiently full to avoid substantial exposure of said hollow fibers membrane during ocean motion of said ship;

(i) returning concentrate and mixed liquor from said hollow fiber membrane container to said bioreactor; and (j) removing purified water from said mixed liquor through said hollow fiber membranes as permeate to provide treated effluent.

* * * * *